US007457735B2

(12) United States Patent
Wu et al.

(10) Patent No.: US 7,457,735 B2
(45) Date of Patent: Nov. 25, 2008

(54) METHOD AND SYSTEM FOR AUTOMATIC WATER DISTRIBUTION MODEL CALIBRATION

(75) Inventors: Zheng Yi Wu, Waterbury, CT (US); Thomas M. Walski, Nanticoke, PA (US); Robert A. Gurrieri, Thomaston, CT (US); Gregg A. Herrin, Burlington, CT (US); Robert F. Mankowski, Watertown, CT (US)

(73) Assignee: Bentley Systems, Incorporated, Exton, PA (US)

( * ) Notice: Subject to any disclaimer, the term of this patent is extended or adjusted under 35 U.S.C. 154(b) by 774 days.

(21) Appl. No.: 10/051,820

(22) Filed: Jan. 17, 2002

(65) Prior Publication Data

US 2003/0093236 A1 May 15, 2003

Related U.S. Application Data

(63) Continuation of application No. 09/990,818, filed on Nov. 14, 2001.

(51) Int. Cl.
| | |
|---|---|
| G06G 7/48 | (2006.01) |
| G06G 7/50 | (2006.01) |
| G01D 18/00 | (2006.01) |
| G01D 21/00 | (2006.01) |
| G01M 19/00 | (2006.01) |
| G01P 21/00 | (2006.01) |
| G01R 35/00 | (2006.01) |
| G06F 19/00 | (2006.01) |

(52) U.S. Cl. ................................ 703/9; 703/10; 702/85
(58) Field of Classification Search .................... 702/85; 703/9, 10
See application file for complete search history.

(56) References Cited

U.S. PATENT DOCUMENTS

| | | | |
|---|---|---|---|
| 5,448,476 A | * | 9/1995 | Kurokawa et al. ............. 702/2 |
| 5,511,188 A | | 4/1996 | Pascucci et al. |
| 5,758,347 A | | 5/1998 | Lo et al. |
| 5,787,283 A | | 7/1998 | Chin et al. |
| 6,119,125 A | | 9/2000 | Gloudeman et al. |
| 6,247,019 B1 | | 6/2001 | Davies |

FOREIGN PATENT DOCUMENTS

JP   60164870 A  *  8/1985

OTHER PUBLICATIONS

Engineering Computer Applications Committee, "Calibaration Guidelines for Water Distribution System Modeling", 1999, American Water Works Assoc., 1-17.*

(Continued)

*Primary Examiner*—Kamini Shah
*Assistant Examiner*—David Silver
(74) *Attorney, Agent, or Firm*—Cesari and McKenna LLP

(57) ABSTRACT

A water distribution model calibration technique is provided that allows a user to design a calibration model by selecting several input parameters desired to be used for the calibration of a model that allows an engineer to collect a complete set of data to represent the overall system conditions at any given time of day. For example, several parameters may be chosen including link status, the pipe roughness coefficient, junction demand, and pipe and valve operational status. Trial solutions of the model calibration are generated by a genetic algorithm program. A hydraulic network solver program then simulates each trial solution. A calibration module runs a calibration evaluation program to evaluate how closely the model simulation is to the observed data.

21 Claims, 5 Drawing Sheets

OTHER PUBLICATIONS

BossIntl.com, "Model Calibration", 1997, http://www.bossintl.com/forums/showthread/s/06d85824a1fe498e3bd7e3bd7ae505115aad6/threadid/4737.html.*

Haestad.com, Haestad Methods—WaterCad, Jan. 2000, http://web.archive.org/web/20000118153014/http://haestad.com/software/watercad/default.asp.*

Haestad.com, WaterCAD : Version Comparison Chart, http://web.archive.org/web/20001211214100/http://haestad.com/software/watercad/VersionChart.asp, 2000.*

BOSS Intl "Optimalization, calibration . . . ", http://www.bossintl.com/forums/showthread.php/s/b5e99c3b9dca5caebb02c3ea9015d0b4/threadid/4942/perpage/15/pagenumber/1.*

DHISoftware.com, "Automatic Calibration of Pipe Network Hydraulic Model", Conference Proceedings 2001, Jun. 6-8, 2001.*

Farmani et al. "Parameter Estimation in Water Distribution Networks using Genetic Algorithms", Identification in engineering systems-International conference 2nd; p. 430-439, Mar. 1999.*

BOSS Intl, "BOSS-International—AirFLOW/SVE—Engineering", http://web.archive.org/web/20010425201312/http://www.sxst.it/Bss_mkn.htm, Apr. 2001.*

D.P. Solomatine, "Genetic and other global optimization algorithms—comparison and use in calibration problems", 3rd Intern. Conf. on Hydroinformatics, Copenhagen Denmark, 1998; pp. 1021-1028.*

A. Strafaci, "Genetic Algorithms in Water Resources Engineering." Current Methods, vol. 1, No. 1, p. 119 to 123, 2001.*

Vairavamoorth et al, "Optimal Design of Water Distribution Systems Using Genetic Algorithms", Computer-Aided Civil & Infrastructure Engineering, Sep. 2000, vol. 15 Issue 5; pp. 374-382.*

Farmani et all "Discrete optimisation of water distribution networks using genetic algorithms", International Conference on Computing and Control for the Water Industry CCWI 1999 UK pp. 427-436.*

Farmani et al "Multi-criterion optimal design of water distribution networks using genetic algorithm" First ASMO UK/ISSMO Conference on Engineering Design Optimisation UK 157-163, Jul. 1999.*

Waters G et al, "Calibration of water distribution network models using genetic algorithms", Hydrosoft 98 Hydraulic Engineering Software, Lake Como Italy Sep. 16-18, 1998, pp. 131-140.*

Ron White "How Computers Work" 7th Edition, pp. 40, 62-63 and 98-99.*

Engineering Computer Applications Committee, "Calibaration Guidelines for Water Distribution System Modeling", 1999, American Water Works Assoc., 1-17.*

BossIntl.com, "Model Calibration", 1997, http://www.bossintl.com/forums/showthread/s/06d85824a1fe498e3bd7e3bd7ae505115aad6/threadid/4737.html.*

Haestad.com, Haestad Methods—WaterCad, Jan. 2000, http://web.archive.org/web/20000118153014/http://haestad.com/software/watercad/default.asp.*

Haestad, Darwin Calibrator Methodology.*

ATSDR, Summary of Findings Historical Reconstruction of the Water-Distribution System Serving the Dover Township Area, New Jersey: Jersey: Jan. 1962-Dec. 1996 http://www.atsdr.cdc.gov/HEC/CSEM/dover/summary/summary.html, Sep. 2001.*

Walters G., Calibration of Water distribution network models using genetic algorithms, pp. 131-140, 1998.*

Walters's "Calibration of water distribution network models using genetic algorithms", pp. 131-140, 1998.*

Haestad Methods, "WaterCAD for Windows" Version 5, User's Guide, pp. 224, 225, cover.*

ATSDR, Summary of Findings Historical Reconstruction of the Water-Distribution System Serving the Dover Township Area, New Jersey: Jan. 1962-Dec. 1996 http:IIwww.atsdr.cdc.govIHECICSEMIdoverIsummary/summary.html, Sep. 2001.*

WaterCAD, WaterCAD for Windows, On-Line Help Text, Version 3.0, Haestad Methods, Inc., Waterbury, CT, 1995-1997.*

P.F. Boulos, Z. Wu, C.H. Orr et al., "Optimal Pump Operation of Water Distribution Systems using Genetic Algorithms", Distribution System Symposium, 2001.*

Zheng Y. Wu et al., Using Genetic Algorithms to Rehabilitate Distribution Systems, Journal AWWA, Nov. 2001, all pages.

Ben Chie Yen, Chapter 6: Hydraulics of Sewer Systems, Dept. of Civil & Environmental Engineering, Univ. of Illinois at Urbana-Champaign, pp. 6.1-6.113 no date.

Boulos, Paul F. et al. "Explicit Calculation of Pipe-Network Parameters", pp. 1329-1344. no date.

Wu, Zheng, "Optimal Capacity Design of Water Distribution Systems," May 19, 2002, ASCE Annual Environmental and Water Resources System Analysis (EWRSA) Symposium, all pages.

Wu, Zheng Yi et al., "Calibrating Water Distribution Model Via Genetic Algorithms," Apr. 14-16, 2002, AWWA IMTech Conference, Kansas City, Missouri, all pages.

Zheng Y. Wu et al., Using Genetic Algorithms to Rehabilitate Distribution Systems, Journal AWWA, Nov. 2001, all pages.

Engineering Computer Applications Commitee, "Calibration Guidelines for Water Distribution System Modeling", Proceedings of AWWA 1999 ImTech Conference, American Water Works Association, 1999, pp. 1-17.

Harding, et al., "Back to Mike Net Support Forum", (http://bossintl.com/forums/showthread/s/06d85824a1fe498e3bd7ae505115aad6/threa . . . ), Boss International, 2003, pp. 1-4.

"WaterCAD", (http://web.archive.org/web/20000118153014/http://haestad.com/software/watercad/def ault . . . 0, Haestad Methods, Waterbury, CT, 2000, pp. 1-4.

"WaterCAD v4.1; Version Comparison Chart", (http://web/archive/org/web/20001211214100/http://haestad.com/software/watercad/versio . . .), Haestad Methods, Waterbury, CT, 2000, pp. 1-2.

Walski, et al., "Back to Mike NET Forum", (http://www/bossintl.com/forums/showthread.php/s/b5e99c3b9dca5caebb02c3ea015d0b4/ . . . ), Boss International, 2003, pp. 1-9.

Babovic, et al., "Automatic Calibration of Pipe Network Hydraulic Model", DHISoftware.com, Conference Proceedings of the 4th DHI Software Conference, Jun. 6-8, 2001, pp. 1-8.

Solomatine, D.P., "Genetic and Other Global Optimization Algorithms—Comparison and Use in Calibration Problems", Proceedings of the 3rd International Conference on Hydroinformatics, Copenhagen, Denmark, 1998, Balkema Publishers, 10 pp.

"Genetic Algorithms in Water Resources Engineering", Current Methods, vol. 1, No. 1, Haestad Methods, Waterbury, CT, pp. 119-123.

Vairavamoorthy, et al., "Optimal Design of Water Distribution Systems Using Genetic Algorithms", Computer-Aided Civil & Infrastructure Engineering, Sep. 2000, vol. 15, Issue 5, pp. 374-382.

Farmani, et al., "Discrete Optimisation of Water Distribution Networks Using Genetic Algorithms", International Conference on Computing and Control for the Water Industry, 1999, Exeter, UK, pp. 427-436.

Farmani, et al., "Multi-Criterion Optimal Design of Water Distribution Networks Using Genetic Algorithm", Association for Structural and Multidisciplinary Optimization / International Society of Structural and Multidisciplinary Optimization Conference, Jul. 1999, Ilkley, UK, pp. 157-163.

Walters, et al., "Calibration of Water Distribution Network Models Using Genetic Algorithms", Hydrosoft 1998 Hydraulic Engineering Software VII, Computational Mechanics Publications, Witpress, Como, Italy, 1998, pp. 131-140.

Wu, Zheng Yi, et al., "Calibrating Water Distribution Model Via Genetic Algorithms", AWWA IMTech Conference, Apr. 14-17, Kansas, MO, Haestad Methods, pp. 1-10.

Wu, Zheng Yi, et al., "Competent Genetic-Evolutionary Optimization of Water Distribution Systems", Journal of Computing in Civil Engineering, Apr. 2001, pp. 89-101.

Wu, Zheng Yi, et al., "Darwin Calibrator—Improving Project Productivity and Model Quality for Large Water Systems", Journal of AWWA, Oct. 2004, 7 pp.

Walski, Thomas, M., "Does Your Model Really Model Your Water Distribution System?", Public Works, Jun. 1987, 2 pp.

Walski, Thomas, M., "Equipment Needs for Field Data Collection In Support of Modeling", 1988, 17 pp.

Wu, Zheng Yi, et al., "Impact of Measurement Errors on Optimal Calibration of Water Distribution Models", International Conference on Technology Automation and Control of Wastewater and Drinking Systems, Jun. 19-21, 2002, Poland, 6 pp.

Walski, Thomas M. et al., "Pitfalls in Calibrating and EPS Model", Aug. 2000, pp. 1-10.

Walski, Thomas M., "Understanding the Adjustments for Water Distribution System Model Calibration", Journal of Indian Water Works Association, Apr.-Jun. 2001, pp. 151-157.

Wu, Zheng Yi, et al., "Verification of Hydrological and Hydrodynamic Models Calibrated by Genetic Algorithms", Proceedings of the International Conference on Water Resources and Environmental Resources, vol. 2, Oct. 29-31, 1996, Kyoto, Japan, pp. 175-182.

Wu, Zheng Yi, "Automatic Model Calibration by Simulating Evolution", M. sc. Thesis, International Institute for Infrastructural Hydraulic and Environmental Engineering, Delft, Netherlands, Apr. 1994.

"WaterCAD for Windows", Version 5 User Guide, Haestad Methods, Waterbury, CT, 2002.

Farmani, et al., "Parameter Estimation in Water Distribution Networks Using Genetic Algorithms", Identification in Engineering Systems—International Conference; $2^{nd}$, Swansea, Wales, UK, Mar. 1999, pp. 430-439.

WaterCAD for Windows: Version 5 User Guide,. Heastad Methods, Inc., Waterbury, Connecticut, 2002.

WaterCAD for Windows, On-Line Help Text, Version 3.0, Haestad Methods, Inc., Waterbury, CT, 1995-1997.

WaterCAD for Windows, User's Guide, Water Distribution Modeling Software, Haestad Methods, Inc., Waterbury, CT, 1986-2001.

* cited by examiner

METHOD AND SYSTEM FOR AUTOMATIC WATER DISTRIBUTION MODEL CALIBRATION

CROSS REFERENCE TO RELATED APPLICATION

This application claims the benefit of the filing date of the following application of which it is a continuation: U.S. patent application Ser. No. 09/990,818, filed Nov. 14, 2001, which is incorporated herein by reference.

BACKGROUND OF THE INVENTION

1. Field of the Invention

This invention relates to calibration of a water distribution model.

2. Background Information

In many civil engineering applications, and in particular, in water distribution networks for cities, townships and municipalities, it is of the utmost importance to have predictive simulations for the water pipe flow and hydraulic pressure conditions for the water network in that area. This is to ensure the availability of the potable water resource to the community, as well as to be able to perform vulnerability studies to produce risk assessments for risks that may be presented, which could affect the water supply.

A water distribution model is employed for these purposes in which data describing field conditions are assembled in a systematic manner to describe pipe flow and junction hydraulic grade lines (HGL), which are pressures, within the water network. The model is desirably capable of simulating conditions encountered at the site.

Engineers and modelers often calibrate the models they construct. A calibration involves the process of adjusting model characteristics and parameters so that the model predicted flows and pressures match actual observed field data to some desirable or acceptable level. Model calibration would not be necessary if the mathematical model exactly represented the actual physical processes and there was a perfect knowledge of all required parameters. Unfortunately, these criteria are not generally met; thus calibration is considered the most desirable way to achieve accurate model adjustment to most closely represent the water network being simulated.

Traditionally, methods for calibrating water distribution network models rely upon field measurement of network pressures, pipe flows, and water levels in storage facilities. The model is constructed, and then field observations are made by an engineer who visits various locations on the site and takes field observed measurements of pipe flows, water levels and pressures. The model is then adjusted on a trial and error basis so that the model simulation result more closely represents the observed data.

For example, a model representation of a water network may be developed which may include information about 12-inch mains, major 8-inch mains and loops and pipes that connect to sampling sites. A roughness coefficient is assumed for all pipes. Another aspect of the network is that of "demand." "Demand," as used herein, relates to the consumer demand for water at a given point in time. Demand patterns can be estimated based on the number of structures of different types in conjunction with an average water use by structures. Using this information, a working model is built to indicate how the network will behave in the real world to determine, for example, how much water is used at certain points in the network. Information is inserted into the working model, such as pipe roughness, and a basic working model is produced.

At this point, the model is then calibrated. As noted, prior techniques involved a trial and error process by which an engineer or modeler monitors various values such as pressure and flow to obtain a predicted model to compare to the observed data. If the predicted model does not compare closely with the observed data, the engineer returns to the working model, makes some adjustments, and runs it again to produce a new set of simulation results. This may have to be repeated many times to make sure that the working model produces a close enough prediction of water network behavior in the real world.

There are several disadvantages to the traditional calibration methods. One such disadvantage is, in a steady-state simulation, it is desired to provide no changes during field observation in the relevant aspects of the network. And yet, the observation itself could incorporate data from different network states. More specifically, an engineer or perhaps several engineers, take measurements in the field sequentially. During the time elapsed between taking the various measurements, the state or condition of certain aspects of the network can change. A simple, but illustrative, example is that of an engineer measuring pipe flow at location A, at which time a network pump may be in an "ON" position, thus the pump is operating. Later, when the engineer takes a field observed measurement at location B, the pump may now be in an "OFF" state, which would change pipe flow (and pressure) readings within the network. The network has changed during the observance of the data in the field, thus affecting the accuracy of the results.

A further disadvantage of traditional modeling techniques is that they are, among other things, quite time consuming. A typical network representation of a water network may include hundreds or thousands of links and nodes. Ideally, during a water distribution model calibration process, the roughness coefficient and pipe diameter is adjusted for each link, and demand adjusted for each node. Typically, however, only a percentage of representative sample measurements are used in a model, due in part to the time and labor requirements associated with gathering the evidence.

In addition, the model calibration process conventionally used does not take into account user weighted observation data such that the user can adjust hydraulic grade line (HGL) and/or pipe flow at data points of particular interest or importance to the user. Furthermore, known model calibration techniques use only one input parameter, pipe roughness, and this parameter is typically not weighted for the particular network involved.

In addition, when model calibration software is employed the software is run and a set of results is produced. However, the user cannot terminate or pause the application during run time to observe data at particular points, but instead, must wait until the application runs in full to then observe a single calibration solution so produced.

There remains a need, therefor, for a calibration process that results in a highly accurate model of a water distribution network. There remains a further need for such a process that does not involve undue amounts of trial and error in which multiple monitoring and measuring visits to the site must occur. There remains a further need for a method which produces a more reliable model, and allows the user to employ a number of weighted parameters which more accurately reflect the particular network being modeled in order to customize that model so that it more closely represents the actual behavior of the network.

There remains a further need for a modeling system in which the calibration can be performed automatically and which calibration process can be refined and manually adjusted during the calibration run time.

It is an object of the present invention to provide a calibration system that achieves these goals and that includes automatic calibration that takes into account a number of parameters and boundary conditions.

SUMMARY OF THE INVENTION

The disadvantages of prior techniques have been overcome by the present invention, which provides an automatic water distribution model calibration process that has improved accuracy and efficiency. Multiple parameters and corresponding boundary conditions are taken into account to provide an accurate representation of the network at an instant in time. The inventive system includes a software program that contains three integral parts: a genetic algorithm module, a hydraulic simulation module and a calibration module. These modules interact to provide an optimized calibration solution.

More specifically, the invention includes a method of automatically calibrating a water distribution model that involves a user selecting multiple calibration parameters. For example, parameters may be chosen including the pipe roughness coefficient, junction demand, and pipe and valve operational status, or any combination of the parameters. Next, the user enters field observed data, namely amounts for pressure and pipe flow. The observed data can be weighted, in accordance with the invention, with a user-selected weighting function to focus the calibration on certain data points. The demand loading information is required for different times of day corresponding to the time when the observed data is collected. For example, there will be a higher figure for the demand loading for high demand times, such as in the morning, and lower amounts for lower demand times such as in the overnight hours. Boundary conditions such as: storage tank levels, pressure control valve settings and pump operation speeds are also entered. In this manner, accuracy is improved by providing a realistic snapshot of the network actually operating at each instant in time.

A genetic algorithm program then generates a population of trial solutions of the model calibration. A hydraulic network solver program then simulates each trial solution. More specifically, the resulting hydraulic simulation predicts the HGL (junction pressures) and pipe flows at a predetermined number of nodes (or data points) in the network. This information is then passed back to the associated calibration module.

The calibration module evaluates how closely the model simulation is to the observed data. In doing so, the calibration evaluation computes a "goodness-of-fit" value, which is the discrepancy between the observed data and the model predicted pipe flows and junction pressures or HGL, for each solution. This goodness-of-fit value is then assigned as the "fitness" for that solution in the genetic algorithm program. One generation produced by the genetic algorithm is then complete. The fitness measure is taken into account when performing the next generation of the genetic algorithm operations. To find the improved "survivors," in this case, the optimal calibration solutions, fitter solutions will be selected by mimicking Darwin's natural selection principal of "survival of the fittest". The selected solutions are used to reproduce a next generation of calibration solutions by performing genetic operations. Over many generations, the solutions evolve, and the optimal or near optimal solutions ultimately emerge.

Multiple near optimal solutions can be made available at the end of the genetic algorithm run. The best solution can be kept, and a number of top solutions produced are also kept. During run time of the optimization, the user can pause the program and observe values at that point, as desired. After the optimization step, a number of model parameter solutions are produced. The user can apply engineering judgment to choose one of these solutions to build a calibrated model, and can also then make manual adjustments to it to refine the results.

BRIEF DESCRIPTION OF THE DRAWINGS

The invention description below refers to the accompanying drawings, in which.

DETAILED DESCRIPTION OF AN ILLUSTRATIVE EMBODIMENT

Figure 1:
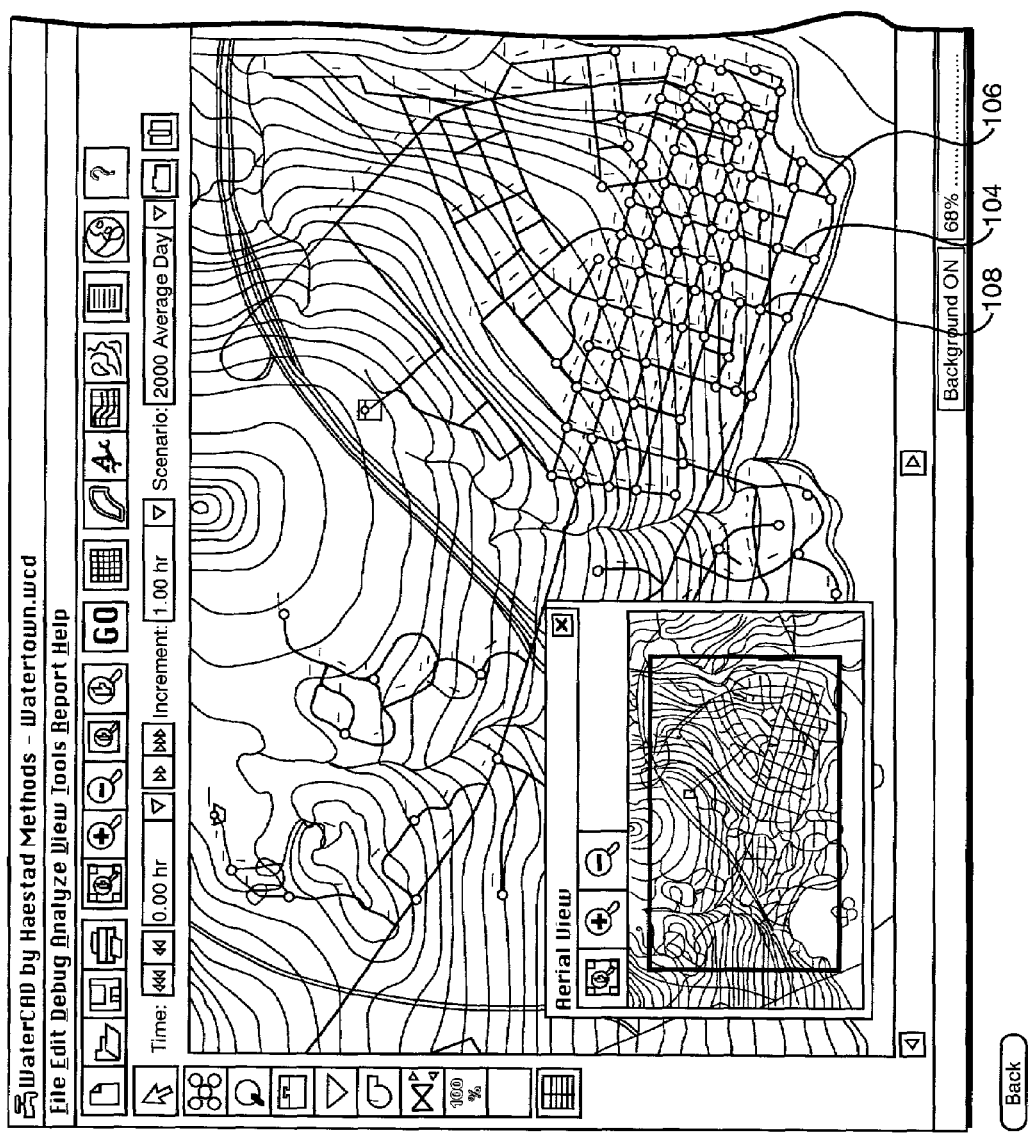
FIG. 1 is a screen shot of a water distribution network to be modeled and calibrated using the method and system of the present invention.

FIG. 1 is an illustration of a screen shot of a user interface employed as part of the present invention in which a water distribution network 100 is depicted schematically. The water distribution network has individual main lines 104, 106, which may include ten-inch diameter pipes, eight-inch diameter pipes, and other hydraulic components. Within the network, a number of pump stations, and valves (not shown) will also be in operation to move and control the flow of water in the network. The pipes, valves and pumps are sometimes collectively referred to herein as "links."

Figure 2:
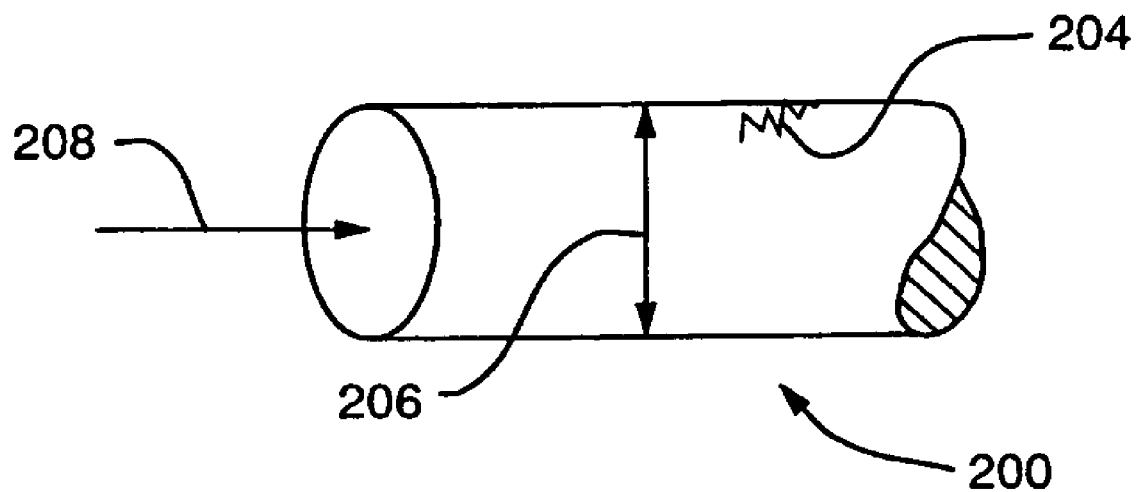
FIG. 2 is a pipe section that may be employed in the network of FIG. 1.

A pipe portion is illustrated in FIG. 2. In modeling and calibrating the model of a water distribution network, in accordance with the present invention, a number of parameters are employed to develop predictions of how the network will behave in operation in the real world. Pipe roughness is one such parameter, such as the roughness schematically illustrated in pipe portion 200 as area 204. The roughness coefficient, and pipe diameter 206 are mathematically related to the velocity of flow 208 through the pipe 200 using the following equation:

$$V = \sqrt{\frac{2gDh_f}{fL}}$$

where V represents the velocity of pipe flow, D is the pipe diameter, $h_f$ is the hydraulic head loss, f is the pipe friction coefficient and L designates the pipe length. The pipe friction coefficient is related to the pipe roughness, hence pipe roughness is a parameter in the modeling process.

Other parameters include junction demand, which is the demand for water at an instant in time at a given junction 108 on the network (FIG. 1). As noted, other parameters include junction pressure, as well as pump and valve operational status.

Figure 3:
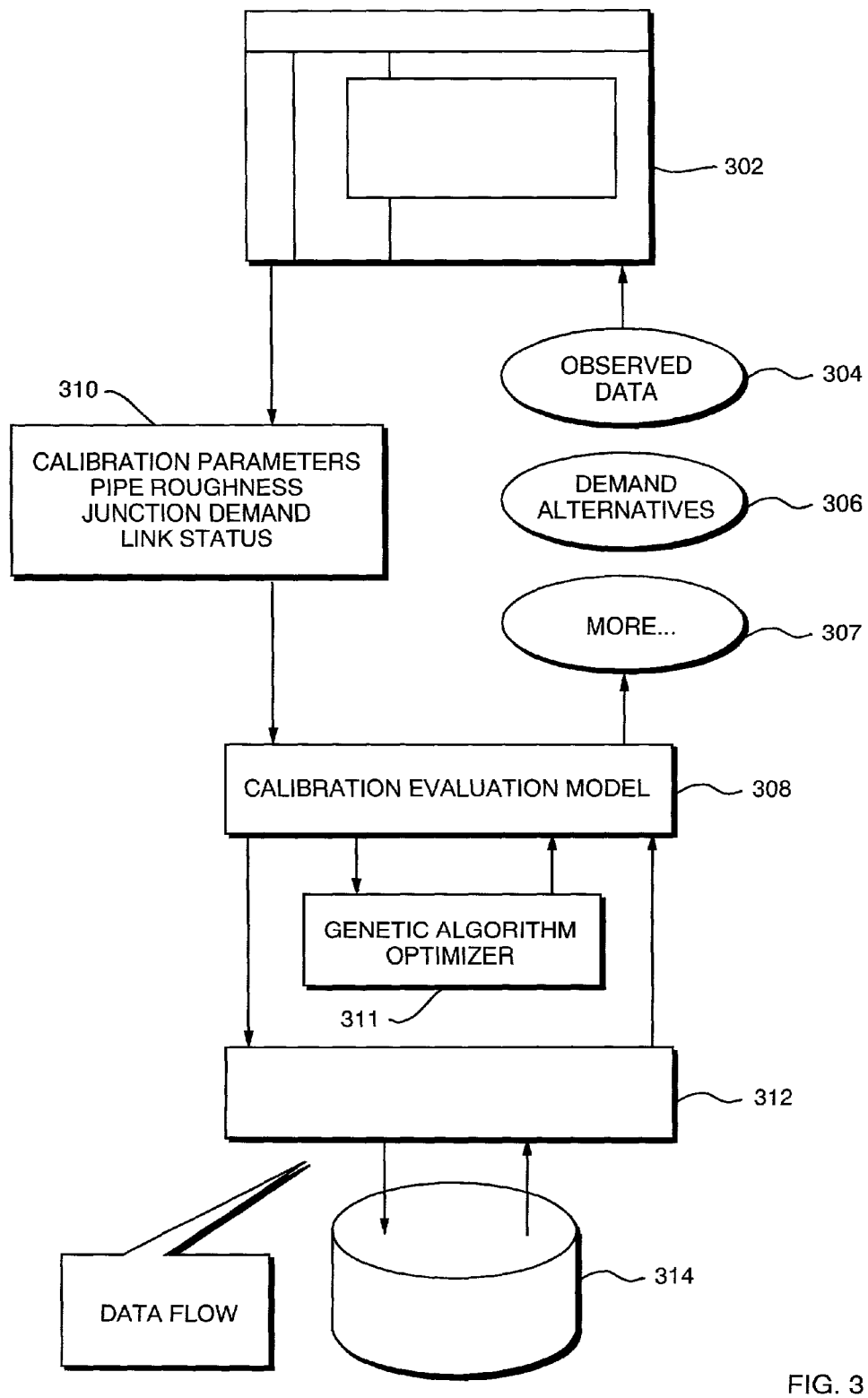
FIG. 3 is a schematic illustration of the data flow in accordance with the present invention.

FIG. 3 is a schematic illustration of the data flow through software modules using the application and user interface embodying the present invention. A user interface 302 is on a personal computer or other workstation lends the user the ability to enter the field observed data 304, the demand alternatives 306 and other information 308 for the network. Next, the user chooses the calibration parameters such as pipe roughness, junction demand and link status, which data is schematically illustrated in block 310.

The field observed data is next transferred to a calibration software module 308. An initial calibration model is then established. It can be either presented to a genetic algorithm module 311 for automatic calibration and/or to a hydraulic simulation model 312 for a manual calibration run. Boundary condition information corresponding to the state of the system, at each point in time when the field observed data was collected is also introduced and entered into the calculation. This produces results that more accurately reflect the system being modeled.

As noted herein, a genetic algorithm is a known model of machine learning, which is derived from a metaphor of the processes of evolution in nature. This is done by the creation (within a machine) of a population of individuals represented by chromosomes. In essence, it includes a set of character strings that is analogous to the base 4 chromosomes seen in DNA. The individuals then go through a process of evolution. Genetic algorithms can be used for an application to obtain a multi-dimensional optimization of a problem in which a character string (the chromosome) can be used to encode values for different parameters being optimized.

In the present invention, the genetic algorithm generates a population of trial solutions of model calibration. Each trial solution is then presented to a hydraulic network simulation module 312 of the present invention. The hydraulic network simulation module 312 embodies a hydraulic network solver that runs a hydraulic simulation to predict the junction pressures and pipe flows at nodes in the network 100. This information, in the form of predictions, is passed back to the calibration module 308 of the present invention.

The calibration module 308 then computes a "goodness-of-fit" value, which is the discrepancy between the model predicted and the field observed values originally input by the user at 302. Using the "goodness-of-fit" information, the genetic algorithm optimizer 311 reproduces better solutions, as the solutions evolve generation after generation. The optimal solution is found at the end of the genetic algorithm run. The fitness of all of the individual parameters in the population is evaluated. A new population is obtained by forming genetically suggested operations such as crossover, reproduction or mutation, on the individuals whose fitness has just been measured. The old population is discarded and the new one is iterated. The first generation of the process operates on the population of randomly generated individuals. From thereon the genetic operations in concert with the fitness measure operate to improve the population and select the "survivors." In the present application, the survivors are the calibration parameters to be used in the water distribution model constructed from the information contained in database 314, to most accurately reflect the behavior of the network in the real world in its physical implementation.

Figure 4A:
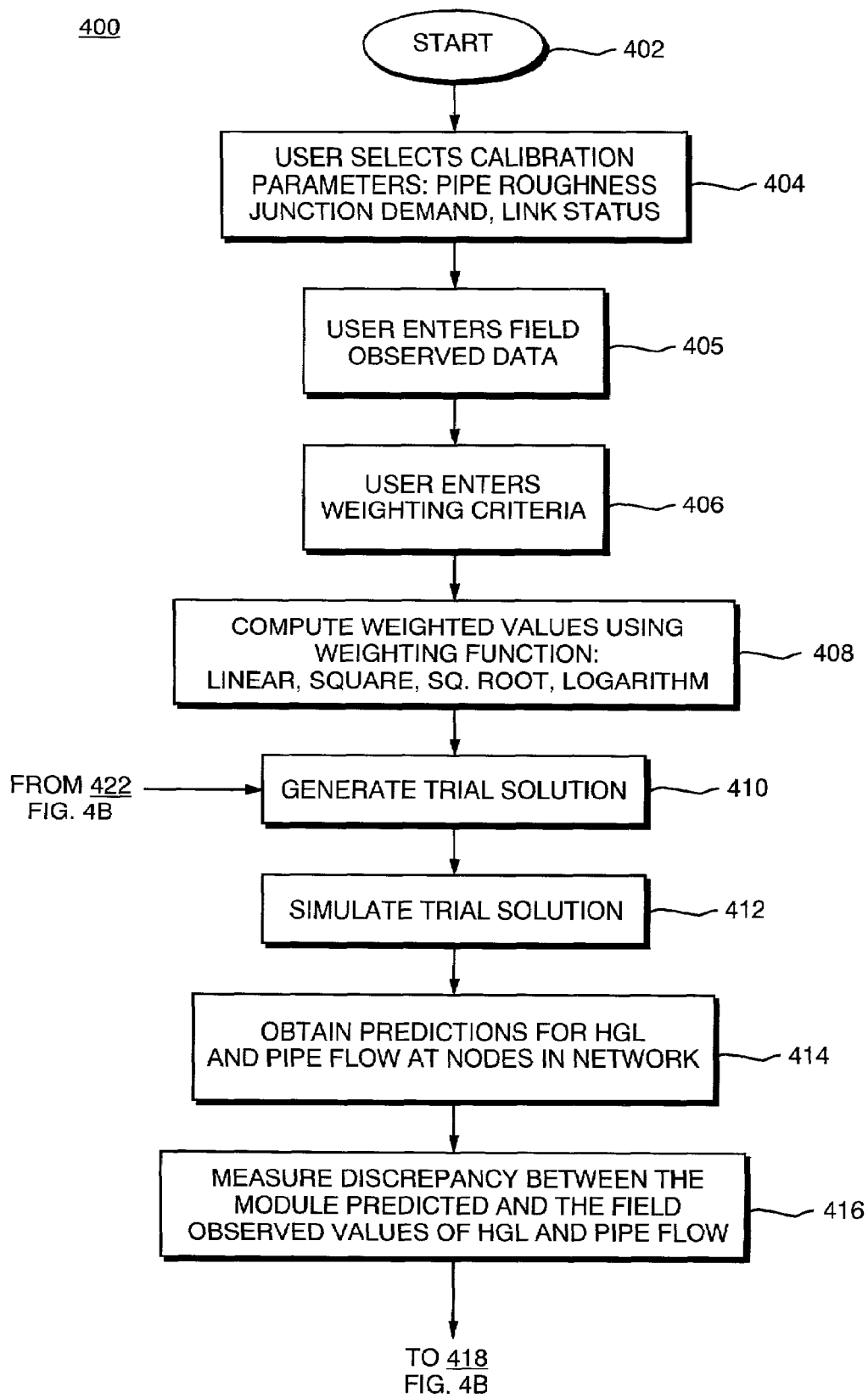
FIGS. 4A and 4B depict a flowchart of a procedure followed in performing the method of the present invention.
Figure 4B:
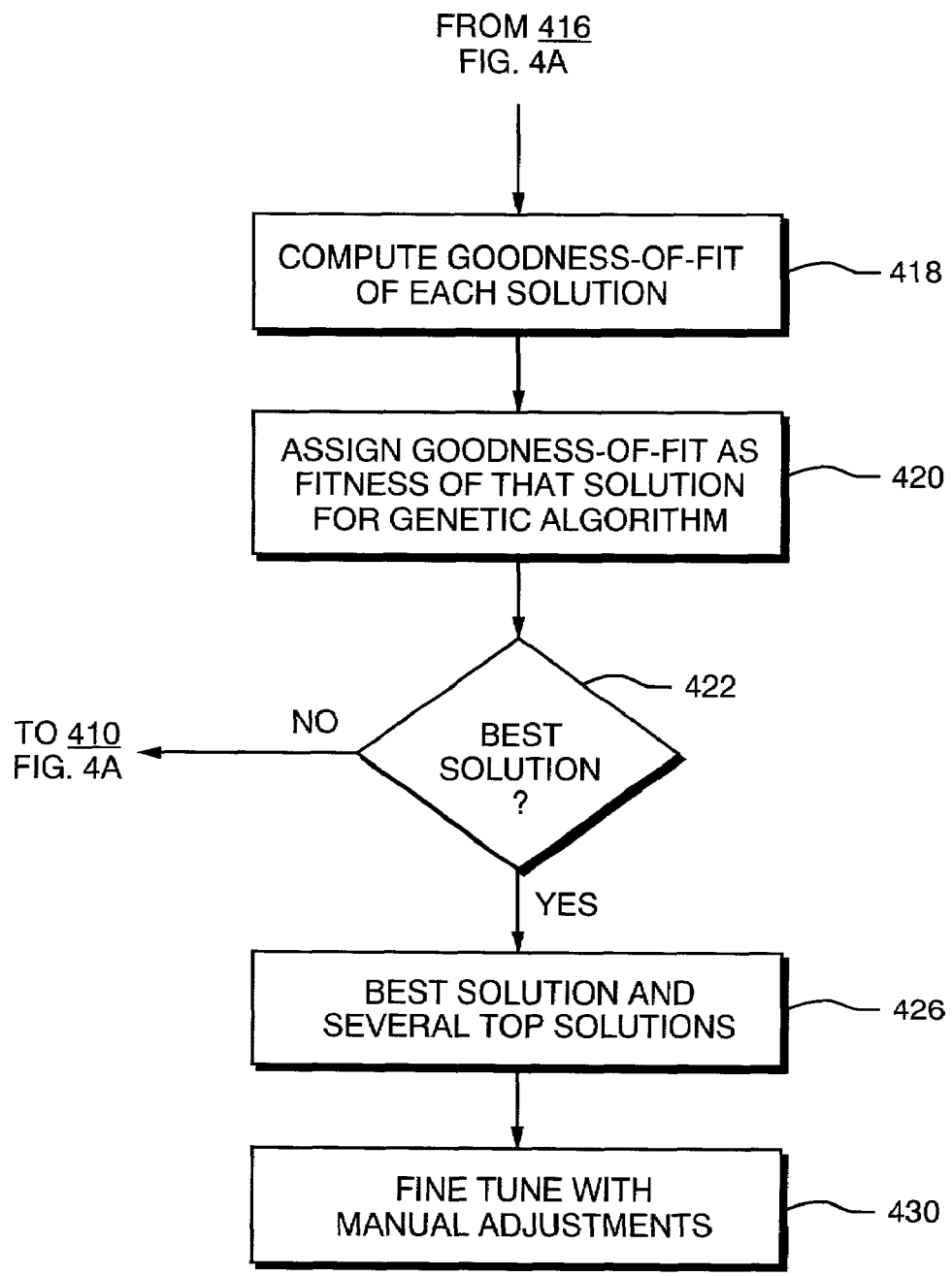

The flowchart of FIGS. 4A and 4B represent a procedure 400 representing the method of the present invention that begins at the Start step, designated by reference character 402. The user supplies the field observed data and selects parameters such as pipe roughness, junction demand and link status as shown in step 404. As noted, the user may deliberately weight the observed data for focussing the calibration on critical data points. In order to do so, the user selects one of four weighting functions which can include, but are not limited to, linear, square, square root and logarithm to conduct the calibration on the weighted, observed hydraulic grade line (HGL) and/or pipe flows, as shown in steps 406 and 408. It may be determined that other weighting functions may also be used while remaining within the scope of the present invention.

The pipe roughness can be either computed as a new roughness value for a group of pipes within the network 100, or modified by multiplying the initial roughness with a correction factor. The junction demand can be selected as a calibration parameter as well. Adjusting the junction demand enables the user to calibrate the model to better reflect the real demand condition when the observed data is collected, thus it improves the accuracy of the overall model calibration. Automatically identifying the link status (open or closed) enhances accuracy, but also assists engineers in quickly clarifying fault operation settings for valves, pipes and pumps in order to perform diagnostics and trouble-shooting of the network.

As noted, loading and boundary conditions are also supplied. Multiple loadings can be employed, and a number of multiple boundary conditions may also be used, as discussed previously herein. Now that the initial information has been entered into the system, the genetic algorithm module generates a population of trial solutions of model calibration, step 410.

The hydraulic network simulation module then runs each trial solution, step 412. The hydraulic simulation predicts the HGL (junction pressures) and pipe flows at various nodes in the network as illustrated in step 414. Thereafter, as illustrated in step 416, the discrepancy between the model predicted and the field observed values of HGL and pipe flow are measured. The "goodness-of-fit" is computed for each solution as shown in step 418 of FIG. 4B. The "goodness-of-fit" is assigned as the "fitness" of that solution for purposes of the genetic algorithm, step 420. Using these entries as the fitness of each solution, the genetic algorithm operations are then again employed (in a repetitive operation), as shown in step 422 and by the feedback loop to the step of block 410, to reproduce each next generation of calibration solutions. It is the genetic algorithm that generates and searches for an optimal solution or several top solutions, step 426, that corresponds with the minimum discrepancy between the simulated and the observed HGL and flow data.

During calibration run time, the user may terminate the program or pause the program as needed to determine intermediate values and can resume the program as desired at any particular point. During the program, manual adjustments may be made and run if desired to check certain criterion or to fine tune (step 430) for changes in the field observed values.

It should be understood that the present invention has many advantages including the feature the user is able not only to calibrate using pipe roughness, but also junction demand and link (pipes, valves and pumps) operational status (open or closed). The pipe roughness can be either computed as a new roughness value for group of pipes, or modified by multiplying the initial roughness with the correction factor. The junction demand can also be selected as a calibration parameter. Adjusting the junction demand enables the user to calibrate the model to better reflect the real demand condition when the observed data is collected, thus it improves the accuracy of the overall model calibration. Further, maximum control of the genetic algorithm optimization run time status is provided in the present invention. As noted, a user can terminate, pause and resume the calibration process.

The sensitivity of the calibrated parameter values can be investigated using a manual adjustment. Sensitivity analysis is the process by which model input parameters are varied over a reasonable range (a range of uncertainty in the value of the model parameters) and the relative change in the model response thereto is observed. For example, the observed change in hydraulic flow rate or pressures can be noted. The purpose of a sensitivity analysis is to demonstrate the sensitivity of the model simulations to uncertainty and values of model input data. The sensitivity of one model parameter versus other parameters can also be demonstrated. Sensitivity analyses are also beneficial in determining the direction of future data collection activities. Data for which the model is relatively sensitive might require further characterization, or more frequent sampling or a greater number of samples over the entire network. This is opposed to the data for which the model is relatively insensitive, in which case the data would not require further field characterization.

A model can be verified to match historical field conditions. This is partly because the choice of parameter values and boundary conditions might not be unique, in that more than one combination of parameter values or boundary conditions can give rise to the same or similar model results. History matching uses the calibrated model to reproduce historical field conditions. The process model of verification may result in further calibration refinement of the model. After the model has successfully reproduced measured changes in field conditions, it is ready for predictive simulations.

It should be understood that the system and method of the present invention provides a genetic algorithm-based software process that produces calibration solutions for a network that is more accurate because it takes a greater number of input parameters into account and the method includes the ability to introduce true steady-state information into the calibration, and it is more efficient because it does not require repetitive trial and error steps.

It should be further understood, that the present invention may also be readily adapted to incorporate other parameters, or boundary conditions, not specifically mentioned herein, but that may be determined to be useful in describing a water distribution network. In such a case, the present invention may be adapted to take those parameters into account in determining optimized calibration for the network model.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of automatically calibrating a water distribution model of a water distribution network, comprising the steps of:
   (A) selecting calibration parameters to be adjusted to calibrate the water distribution model, the calibration parameters including link status and one or more of, pipe roughness and junction demand;
   (B) collecting field observed data including a pipe flow measurement and a junction pressure measurement for at least one point in the water distribution network, and including corresponding loading conditions and boundary conditions describing settings of valves or pumps that existed in the network when said field observed data was collected and passing such information to a genetic algorithm module;
   (C) generating at said genetic algorithm module a population of calibration solutions that comprise a set of calibration results, using a genetic algorithm;
   (D) running multiple hydraulic simulations of each solution to obtain a set of predictions of pipe flows and junction pressures at selected points in the network, corresponding to the loading conditions and associated boundary conditions when the field observed data was collected;
   (E) performing a calibration evaluation including computing a goodness-of-fit value for each calibration solution based upon differences between field observed values and said predictions;
   (F) repeating steps (C) through (E) until a user-selected desired goodness-of-fit value is obtained resulting in a corresponding calibration solution for calibrating a water distribution model; and
   (G) building a calibrated water distribution model using the desired set of calibration parameters.

2. The method of automatically calibrating a water distribution model as defined in claim 1, including the further steps of:
   (A) prior to passing said field observed data to said genetic algorithm module, selecting a weighting function for at least one of said field observed data measurements, said weighting function formulated as a weighting factor of observed pressure heads and flows;
   (B) applying said weighting function to said field observed data when running said calibration evaluation to determine said goodness-of-fit value.

3. The method of automatically calibrating a water distribution model, as defined in claim 1, including the further step of:
   selecting as said loading condition, at least one water demand loading at a predetermined time of day, corresponding to a time of day when a field observed data measurement has been made.

4. The method of automatically calibrating a water distribution model, as defined in claim 3, including the further step of selecting multiple loading conditions representing demand loading at various times of day when field observed data measurements have been made.

5. The method of automatically calibrating a water distribution model as defined in claim 1 wherein said boundary conditions include water storage tank levels, pressure control valve settings and pump operation speeds.

6. The method of automatically calibrating a water distribution model as defined in claim 1 including the further step of:
   after said desired goodness-of-fit value and corresponding calibration solution is obtained, making manual adjustments to this information for said water distribution model calibration.

7. The method of automatically calibrating a water distribution network model as defined in claim 1, including the further step of performing a sensitivity analysis by varying model input parameters over a predetermined range and observing the response thereto of said model.

8. The method of automatically calibrating a water distribution network model as defined in claim 7 including the further step of adjusting the collection of field observed samples based upon the results of said sensitivity analysis.

9. A computer readable medium containing executable program instructions for automatically calibrating a water distribution model of a water distribution network that has links that include pipes and junctions, the executable program instructions comprising program instructions for:
   (A) a graphic user interface by which a user may enter data concerning field observed data, demand alternatives and other information for the network;

(B) a calibration module configured to adjust user-selected calibration parameters to calibrate the water distribution model, the calibration parameters including link status and one or more of, pipe roughness and junction demand;

(C) a genetic algorithm module coupled to said calibration module and said user interface that receives information about said calibration parameters, and user-entered field observed data, including field data that include calibration target data and boundary data describing settings of valves or pumps, said genetic algorithm being configured to produce a population of calibration solutions, and said graphic user interface further being configured to allow the user to select at least one of goodness-of-fit criteria, a weighting function, and one or more genetic algorithm parameters; and (D) a hydraulic network simulation module communicating with said genetic algorithm module such that calibration solutions generated by said genetic algorithm module can be run by said hydraulic network simulation module to predict actual behavior of said network, such that predictions are passed back to said calibration module for comparison with field observed data to produce goodness-of-fit values, until a desired goodness-of-fit value satisfying user-selected goodness-of-fit criteria is obtained resulting in a corresponding calibration solution for calibrating a water distribution model, wherein the corresponding calibration solution is used to build a calibrated water distribution model.

10. The computer readable medium as defined in claim 9, wherein the genetic algorithm module is configured to repetitively compute successive generations of solutions in one or more calibration runs, and calibration solutions are stored for retrieval and evaluation.

11. The computer readable medium as defined in claim 9 further comprising program instructions for:
a database including information regarding water distribution networks for constructing models of said networks, and into which information can be saved.

12. The computer readable medium as defined in claim 9 wherein said graphic user interface further allows the user to enter information regarding alternative demand loadings, representing a demand for water supply at a given point in time, at a given location in the network.

13. The method as described in claim 1 wherein link status is a status of being opened or closed of one or more of pipes or valves and as being on or off for pumps, in the water distribution model of the water distribution network that is being calibrated.

14. The method as defined in claim 1 further comprising the step of:
computing a roughness value, roughness multiplier, and identifying link status.

15. The computer readable medium as defined in claim 9 comprising program instructions for performing the further steps of:
pausing a calibration run;
determining intermediate values;
observing the intermediate values by a user and
resuming said calibration run.

16. A computer implemented method, the method comprising:
calibrating a water distribution model wherein model calibration parameters are generated by providing an initial selection of parameters to be adjusted including link status and one or more of pipe roughness and junction demand to a genetic algorithm module, and performing the steps of:
(A) receiving at said genetic algorithm module, said selected parameters and field observed data, and generating at said genetic algorithm module a calibration solution for said calibration parameters;
(B) receiving said calibration solution at an associated hydraulic simulation module and running a hydraulic simulation of the model using said calibration solution;
(C) producing as a result at said hydraulic simulation module, a set of predictions of junction pressures and pipe flows for nodes in a water distribution model for said calibration solution;
(D) passing said predictions for that calibration solution to an associated calibration module to evaluate how closely the predictions are to field observed data and assigning a goodness of fit value to that calibration solution;
(E) repeating steps A through D a plurality of times and passing the goodness of fit value to a genetic algorithm module for each solution;
(F) calculating at said genetic algorithm module, solutions that correspond with a minimum discrepancy between the simulated predictions and the observed data to obtain a desired set of calibration parameters for use in calibrating a water distribution model; and
building a calibrated water distribution model using the desired set of calibration parameters.

17. The method as defined in claim 16 including the further step of performing a sensitivity analysis by varying parameters for a roughness, demand and link status over a predetermined range and observing the relative change in the model response thereto.

18. The method as defined in claim 16 including the further step of matching the model to historical field conditions.

19. The method as defined in claim 16 including the further step of assigning a selected group of pipes to be in a particular roughness group and assigning a roughness calibration variable being one of a roughness coefficient or a roughness coefficient multiplier as the roughness calibration parameter for that roughness group.

20. The method of automatically calibrating a water distribution network model as defined in claim 1 wherein link status indicates whether valves, pipes or pumps are open or closed.

21. A computer implemented method, the method comprising:
calibrating a water distribution model wherein a plurality of model calibration parameters are generated by providing an initial selection of parameters to be adjusted to a genetic algorithm module, the initial selection of parameters including both pipe and valve operational state and junction demand, and performing steps of:
(A) receiving at said genetic algorithm module, said selected parameters and field observed data, and generating at said genetic algorithm module a calibration solution for said calibration parameters;
(B) receiving said calibration solution at an associated hydraulic simulation module and running a hydraulic simulation of the model using said calibration solution;
(C) producing as a result at said hydraulic simulation module, a set of predictions of junction pressures and pipe flows for nodes in a water distribution model for said calibration solution;
(D) passing said predictions for that calibration solution to an associated calibration module to evaluate how closely the predictions are to field observed data and assigning a goodness of fit value to that calibration solution;

(E) repeating steps A through D a plurality of times and passing the goodness of fit value to a genetic algorithm module for each solution;

(F) calculating at said genetic algorithm module, solutions that correspond with a minimum discrepancy between the simulated predictions and the observed data to obtain a desired set of calibration parameters for use in calibrating a water distribution model; and building a calibrated water distribution model using the desired set of calibration parameters.

* * * * *